Aug. 22, 1961 H. HOOLIM Re. 25,031

MEANS USED IN DESIGNING PATTERNS

Original Filed Oct. 22, 1956 3 Sheets-Sheet 1

INVENTOR.
Haar Hoolim
BY
Rines and Rines
Attorneys

MEANS USED IN DESIGNING PATTERNS

Original Filed Oct. 22, 1956 3 Sheets-Sheet 2

INVENTOR.
Hans Hoolim
BY
Ruiz and Ruiz
Attorneys

MEANS USED IN DESIGNING PATTERNS

Original Filed Oct. 22, 1956 3 Sheets-Sheet 3

INVENTOR.
Hans Hoolim
BY
Rice and Rice
Attorneys

United States Patent Office

Re. 25,031
Reissued Aug. 22, 1961

25,031

MEANS USED IN DESIGNING PATTERNS

Haar Hoolim, Migdal Ascalon, Israel

Original No. 2,881,537, dated Apr. 14, 1959, Ser. No. 617,400, Oct. 22, 1956. Application for reissue Apr. 22, 1960, Ser. No. 24,187
6 Claims. (Cl. 35—27)

Matter enclosed in heavy brackets [ ] appears in the original patent but forms no part of this reissue specification; matter printed in italics indicates the additions made by reissue.

The present invention relates to a new means which serves in designing new patterns, e.g. for floor tiles, mosaic floors, textile patterns and the like. At the same time the new means can be used as a game, more particularly as a game of patience to be played by one person, or a game of skill to be played by two or more persons.

It is an object of the invention to provide a means which is a help in designing industrial patterns.

It is a further object of the invention to provide a means which is inexpensive in manufacture. Yet another object of the invention is to provide a means which allows the designer freedom in exercising his artistic talents and taste. Finally it is an object of the invention to provide a means which can serve as a game both for adults and young people.

According to the invention the new means comprises a number of slabs, boards, sheets, cards of any appropriate material, such as plastics, Celluloid, cardboard, wood, hardboard, glass, ceramic material, sheet metal, cast metal or any other material which can be given a prismatic, preferably slab or panel shaped form, said bodies bearing marks on one side thereof which marks are constituted by six fields—two across and three lengthwise—which fields are separated from each other by division lines, and further by having one of two characteristics, the term characteristic wherever used in this description and the [claim] *claims* being an indication of colour, tint, hatching or the like. It will be seen that accordingly on one side of such a body the six fields may be all of the same characteristics or one of one and five of the other characteristic, two of one and four of the other characteristic, and so on. Moreover, the characterisation of the six fields in relation to each other may be chosen in accordance with the mathematical possibilities afforded by the existence of six fields. Thus, within the scope of the possibilities afforded a very great number of permutations would result upon combining the bodies with each other.

In simpler executional forms the said bodies may be cardboard or Celluloid sheets on which the pattern appears on one side or on both sides thereof. The two sides may be identical or not. In the case of more substantial slabs of ceramics, plastics or wood the pattern may also appear on one or both sides.

In use the cards of slabs are placed in close juxtaposition with each other, so that the fields combine to form a well defined design, which then can be used for industrial purposes.

In use for a game the sheets or slabs are placed alongside each other, say in a staggered relation, so that the identical fields of two juxtaposed cards lie against each other, or, reversely that fields with different characteristics lie against each other.

The invention will now be described with reference to the annxed drawings showing the new invention by way of example in a schematical manner. For the sake of simplicty of all slab or panel shaped bodies only one side, bearing the markings has been shown in the drawings.

Figure 8:
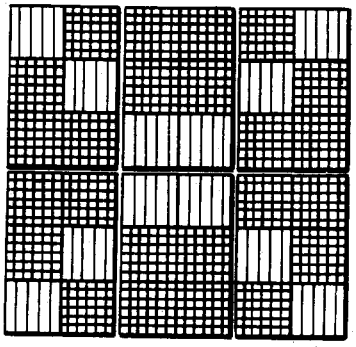

FIG. 8 six such bodies.

Figure 9:
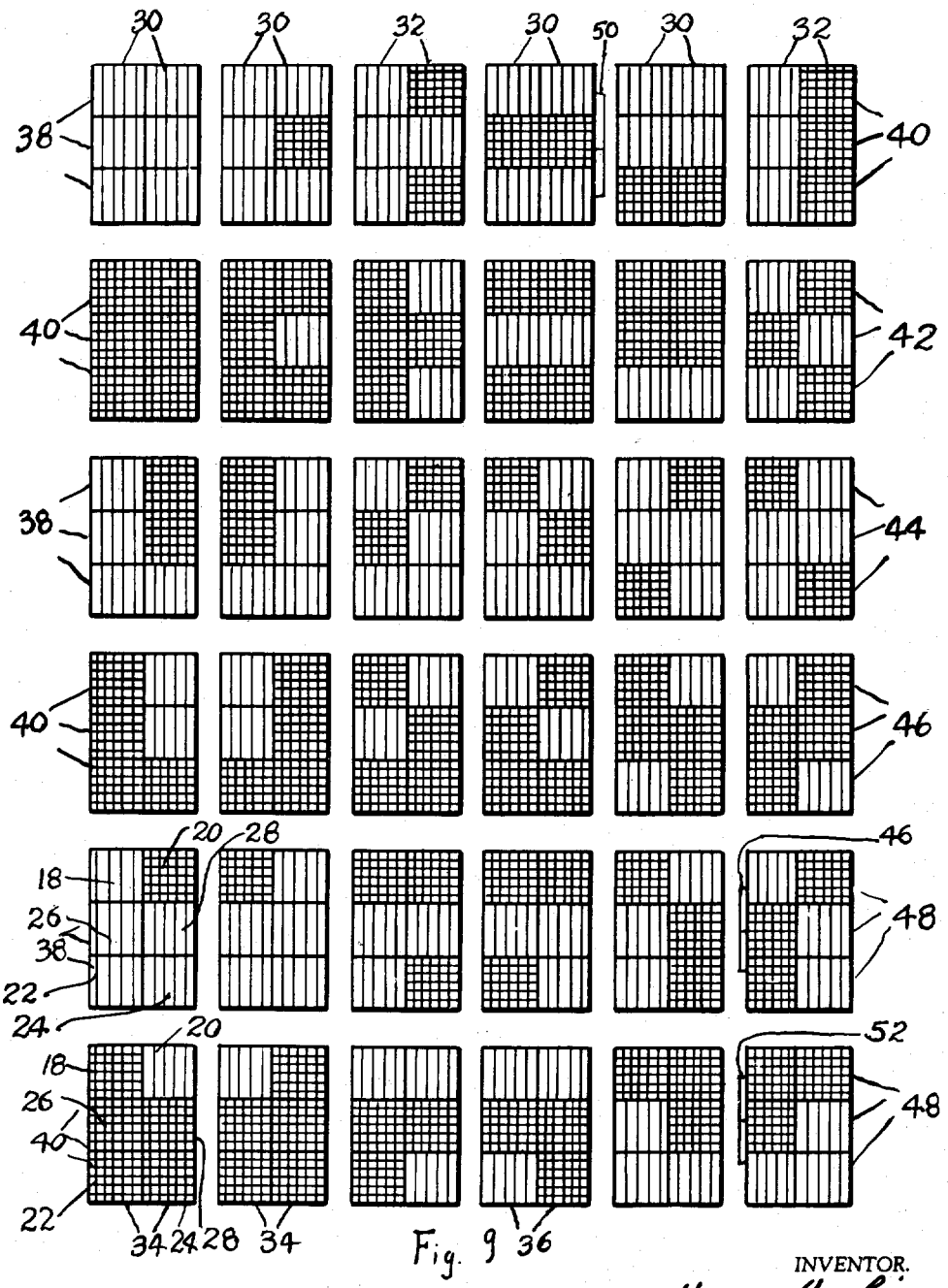

FIG. 9 shows the 36 bodies which form a set.

Figure 10:
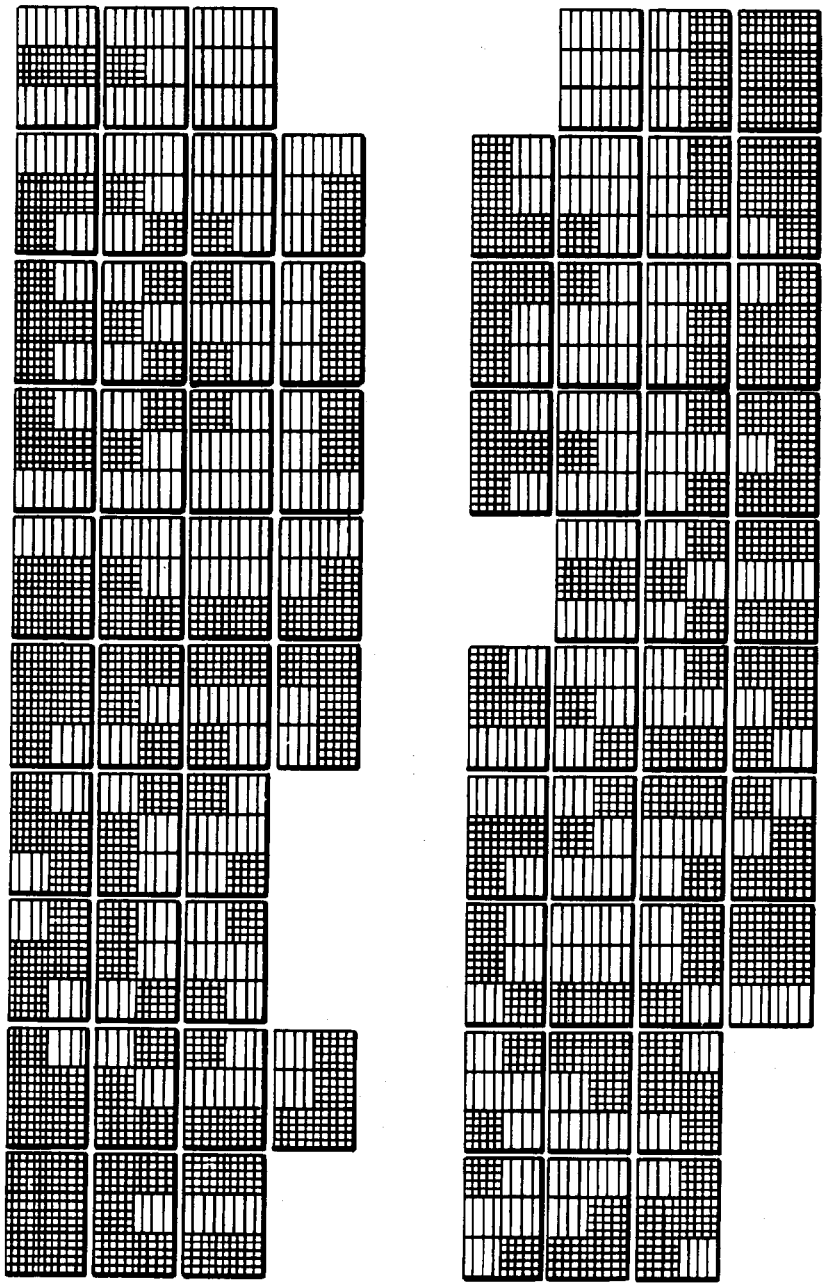

FIG. 10 shows two tableaux, each being composed of 36 bodies forming a set.

Figure 7:
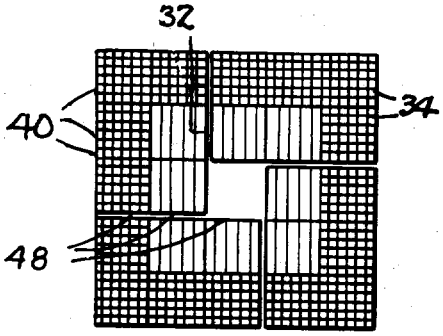
FIG. 7 shows four juxtaposed bodies.

As will be seen from FIG. 9, 36 possibilities exist with six fields on each body and two characteristics; out of these 36 bodies forming one set, or using several sets, an indefinite number of designs can be combined, FIGS. 7 and 8 being examples thereof.

In FIG. 7 four bodies are placed around an empty square, all four bodies having two fields of one characteristic and four of the other characteristic. The result is a square formed by the vertically hatched fields and a larger square enclosing the first one and formed by the crosswise hatched fields.

In FIG. 8 the vertically hatched fields form an X-like pattern on the background of the crosswise hatched fields.

FIGS. 7 and 8 are thus simple forms of designs which might be industrially applied, say to floor tiles.

FIG. 9 shows all 36 bodies, while

FIG. 10 shows two examples of games, where the bodies are so positioned, that the characteristics of the fields "match" at the line of contact of two bodies.

*The bodies are each shown provided on at least one of its main faces with an area bounded by four sides. Specifically, as illustrated, the area may be rectangular. The oppositely disposed short sides of the rectangle are each shown, in FIG. 1, as containing two units 2 of length, separated by a division point 4. The oppositely disposed long sides of the rectangle are similarly each shown as containing three units 6 of length, separated by two division points 8 and 10. The two division points 4 of the short sides of the rectangle are shown connected by a long division line 12. The corresponding division points 8 and the corresponding division points 10 of the long sides of the rectangle are shown respectively connected by division lines 14 and 16 that cooperate with the long division line 12 to separate the rectangular area into six identical square fields, the lengths of the sides of which, therefore, are naturally the unit length. It will be observed that, according to this particular illustrated arrangement, two of these identical square fields border along each short side, and three along each long side, of the rectangle.*

Figure 1:
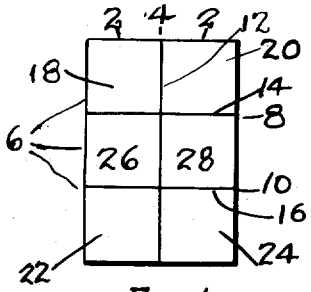
FIG. 1 shows a body with six unmarked fields.

*In FIG. 1, the two identical square fields bordering along the upper of the two short sides of the rectangle are indicated at 18 and 20, and the two identical square fields bordering along the lower of the two short sides are indicated at 22 and 24. The three identical square fields bordering along the left-hand long side are the two square fields 18 and 22 and a square field 26 interposed intermediately therebetween. The three identical square fields bordering along the right-hand long side are the two square fields 20 and 24 and a square field 28 interposed intermediately therebetween.*

*The identical square fields 18, 20, 22 and 24, bordering along the two short sides of the rectangle, are accordingly each provided with two externally exposed sides, either of which may be arranged, as hereinafter more fully explained, adjacent to an externally exposed side of an adjacently disposed body. These two externally disposed sides of the square field 18, for example, are its uppermost side and its lefthand side, meeting at its upper left-hand corner. The other two sides of the square field 18 are respectively disposed adjacently to the square field 20 and the square field 26 and, therefore, are not exposed externally. The intermediately disposed square fields 26 and 28, on the other hand, are each provided with only a single externally disposed* side, which alone, therefore, may be arranged adjacent to a square field of only a single adjacently disposed body. The single exposed side of the intermediately disposed square field 26, for example, is the side at its extreme left, as viewed in FIG. 1. The remaining three sides of this intermediately disposed square field are respectively adjacent to the square fields 18, 28 and 22 and, therefore, are not externally exposed.

Figure 2:
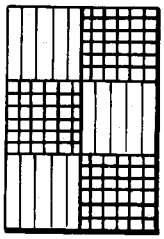
FIGS. 2–6 show five bodies each with six fields displaying two different characteristics, the characteristics being represented by crosswise and vertical hatchings respectively.
Figure 3:
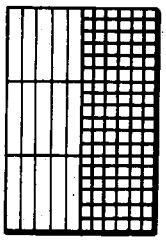
Figure 4:
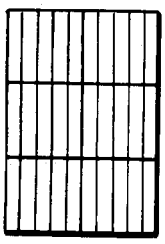
Figure 5:
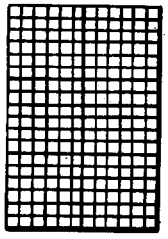
Figure 6:
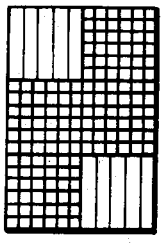

By reason of the construction described above, the bodies are all identical, except for the design characteristics marked in the various square fields. In FIG. 4, for example, the design characteristics of the six square fields are shown all as of one of the two design characteristics before described, indicated by vertical hatching. In FIG. 5, on the other hand, the six design characteristics are all shown as of the other of the said two design characteristics, indicated by cross-hatching. In FIGS. 2, 3 and 6, as further examples, the six square fields are shown as provided with different arrangements, each square field, however, being shown provided with one or the other of the said two characteristics.

In the case of the particular rectangle illustrated by the drawings, with two units of length along the short sides, and three along the long sides of the rectangle, it is possible, in accordance with the mathematical law of combination and permutation, to have a set of 36 such bodies, as illustrated in FIG. 9, all with different design characteristics, as determined on the basis of two variables in six positions.

According to that law of mathematics, of course, since any of these six square fields of each of the 36 bodies of FIG. 9 may be provided with one or the other of two design characteristics, any two adjacently disposed square fields along the width of the rectangle may be provided with the square of 2, or 4, different arrangements of these two design characteristics, represented, in FIG. 9, at 30, 32, 34 and 36; and any three square fields disposed along the length of the rectangle may be provided with the cube of 2, or 8, different arrangements of these two design characteristics, represented, in FIG. 9, at 38, 40, 42, 44, 46, 48, 50 and 52. In general, the number of the different arrangements of the design characteristics bordering along each side of at least some of the four-sided areas of the bodies is 2, raised to a power equal to the number of fields bordering along such sides. That power, as before explained, is 2 along the width of the rectangle illustrated by the drawings, and 3 along its length.

It follows, as a direct result of the said mathematical law, that at least some of the design characteristics of these bodies are mirror images of the design characteristics of others of these bodies. The bottom row of FIG. 9, for example, shows three pairs of such bodies, the design characteristics of the two bodies of each pair being the mirror image of the design characteristics of the other body of each pair. The same is true, indeed, of the design characteristics of all the four lowermost rows of the bodies shown in FIG. 9. The expression "at least some" is used above because this is not true of the design characteristics of the bodies of the two uppermost rows shown in FIG. 9.

It should be observed, however, that the same mathematical law that yields bodies with mirror images yields also bodies with opposites, the opposite or reverse characteristics appearing in corresponding squares. The two lowermost bodies in the first or left-hand column of FIG. 9, for example, are opposites or reversals, the square fields 18, 26, 22, 24 and 28 of the one, represented by the vertical-hatching characteristics, being represented by cross-hatching, or the reverse characteristics in the other, and the square field 20 of the one, represented by cross-hatching, being represented by vertical hatching in the other.

Similar remarks apply also to the two lowermost bodies in the column of FIG. 9 immediately to the right of the said first or left-hand column.

These four bodies in the left-hand lower column of FIG. 9 and in the column immediately to the right thereof, therefore, provide a quartet or species containing two pairs of bodies, each pair with mirror images, and two pairs of bodies, each pair with opposites. The opposites, of course, may be matched, within the scope of the present invention, similarly to the matching of the mirror images. The term "matching" is used herein, in this broad sense, to include the matching of either like or reverse characteristics.

There are cases where a pair of bodies may simultaneously be mirror images and also opposites. An example is afforded by the two right-hand bodies of the second row from the bottom, in FIG. 9.

It will be observed that the 36 bodies shown in FIG. 9 contain five such quartets or species, each containing two pairs of bodies, each pair with mirror images, and two pairs of bodies, each pair with opposites. To each body, there corresponds another body with its mirror image, a further body with its opposite, and still one more body with the image of this opposite.

There are also nine additional non-quartet species, seven with only two bodies each, and two with only one body each.

The quartets or species may, in turn, themselves, serve as units for the designing of further patterns, matching as above described.

It should be understood, however, that the practice of the present invention is not restricted to use only with the 36 bodies illustrated by FIG. 9. The invention may be practiced also, for example, with the aid of several such sets; and with the aid even of parts only of such sets, as illustrated, for example, by FIGS. 7 and 8.

The pattern shown in FIG. 7, as an illustration, is produced by only four of the bodies; and that shown in FIG. 8 by only 6, constituted of three vertically disposed pairs. In FIG. 7, the complete design characteristics bordering along the widths of four identical bodies are shown matching part only of the complete design characteristics bordering along the lengths of adjacently disposed bodies, yet these four bodies are all identical, each with the width design characteristics 32 and 34 and the length design characteristics 40 and 48. In FIG. 8, on the other hand, though the design characteristics bordering along the widths of the adjacently disposed bodies of the three vertically disposed pairs of bodies match, the adjacently disposed horizontally disposed bodies do not match. In the cases of both FIGS. 7 and 8, the design characteristics bordering along predetermined sides of the bodies, illustrated as the sides along the widths of the bodies, match the design characteristics bordering along predetermined sides or parts of sides of others of the bodies. In FIG. 8, the complete design characteristics along the widths of the bodies match the complete design characteristics along the widths of others of the bodies. In FIG. 7, the design characteristics along part only of the lengths of the bodies match the complete design characteristics along the widths of the bodies. In FIG. 10, on the other hand, there is complete matching of the design characteristics along all the sides, both those along the widths and those along the lengths of the bodies. In FIG. 10, indeed, several designs are illustrated wherein the design characteristics along all four sides of each body are matched by the design characteristics along the sides of adjacently disposed bodies, excepting only for those bodies along the outside of the patterns. By means of multiple matching of this character, it becomes possible to provide compact designs without any unoccupied interior openings. This result can not be attained with the aid of bodies, like dominoes, for example, that can be matched along some of their sides only, and not along all their sides.

*It is also within the scope of the present invention, however, to utilize these bodies for the purpose of designing patterns even in cases where the design characteristics of the sides of the bodies do not always match the design characteristics of adjacently disposed sides of others of the said bodies. In FIG. 7, for example, the design characteristics along all four sides of some of the bodies do not match the design characteristics on all four sides of others of the bodies, with the result that a central opening appears in the pattern. According to the specific arrangement of this FIG. 7, the four bodies are arranged in the form of a square of 5 x 5 with the center square open, wherefore, one external side only of each of the four internal or central corner fields, belonging to as many bodies, is matched, the other external sides of these four corner square fields forming the border of the center square. The corner square could, however, be matched on the two external sides, as in FIG. 8.*

*Further madifications may be made by persons skilled in the art, and all such are considered to fall within the spirit and scope of the present invention as disposed in the appended claims.*

*What is claimed is:*

*1.* Means for composing patterns out of a plurality of square elements having different characteristics, comprising, in combination, a set of 36 flat bodies having two main faces, bounded by a rectangular contour composed of two short outer edges containing two units of length, and of two long outer edges containing three units of length, so that the juxtaposition of three pairs of said bodies with their respective long edges in abutment, each pair being formed by placing the short edges of two of said bodies in abutment, constitutes a square with edges containing each six units of length, and each of said bodies bearing at least on one of said main faces a set of markings, the markings of each one of said bodies differing from any other one of said set, said markings being constituted by six mutually adjoining square elements having each at least one edge coinciding with one of said outer edges and having each at least two edges in common with adjoining square elements, the length of each of said common edges of said square elements being one of said units of length, and each of said square elements having one of two characteristics, the difference in the markings being obtained by varying the relative position and characteristic of each square element between the individual bodies according to the laws of combination and permutation on the basis of two variables in six possible positions, so that various specific patterns can be composed of a plurality of said bodies by juxtaposing the individual bodies in an arrangement in which the characteristic of each square element of one body is identical with that of the adjacent square element of the juxtaposed body.

*2. Means for use in designing patterns comprising 36 bodies each having a rectangular area the oppositely disposed short sides of which each contains two units of length separated by a division point and the oppositely disposed long sides of which each contains three units of length separated by two division points, the division points of the short sides being connected by a long division line, corresponding division points of the long sides being connected by two short division lines that cooperate with the long division line to separate the area of the body into six identical square fields, the lengths of the sides of which are the unit length, and with two of the square fields bordering along each short side and three of the square fields bordering along each long side of the rectangle, the fields each carrying one or the other of two design characteristics, and the design characteristics of the 36 bodies differing from one another according to the mathematical law of combination and permutation on the basis of two variables in six positions.*

*3. Means for composing patterns out of a plurality of rectangular units each having a surface thereon formed into a plurality of square elements, each unit having at least two pairs of elements formed thereon, the sides of which abut to form a double row of elements, each of said elements having one of two characteristics, the difference in the composite characteristics of the units being obtained by varying the relative positions of the characteristics of each element of the individual units to provide all possible combinations and permutations in order that various specific patterns can be composed of a plurality of such units being disposed adjacent each other in any desired arrangement.*

*4. Means for composing patterns out of at least four rectangular units each having a surface thereon formed into a plurality of square elements, each unit having at least two pairs of elements formed thereon, the sides of which abut to form a double row of elements, each of said elements having one of two characteristics, the difference in the composite characteristics of the units being obtained by varying the relative positions of the characteristics of each element of the individual units to provide at least four different combinations and permutations of the characteristics in order that various specific patterns can be composed of a plurality of such units being disposed adjacent each other in any desired arrangement.*

*5. The invention of claim 4, wherein one of the units is a mirror image of another of the units and the opposite of still another of the units.*

*6. The invention of claim 4, wherein the composite characteristics of a pair of said units are a mirror image of the composite characteristics of another pair of said units, and wherein the composite characteristics of a further pair of said units are the opposite of the composite characteristics of still another pair of said units.*

References Cited in the file of this patent or the original patent

UNITED STATES PATENTS

| | | |
|---|---|---|
| 108,781 | Hamilton | Nov. 1, 1870 |
| 191,167 | Mueller | May 22, 1877 |
| 741,142 | Keller | Oct. 13, 1903 |
| 1,453,728 | Rhodes | May 1, 1923 |
| 1,675,891 | Graham | July 3, 1928 |
| 1,973,564 | Graham | Sept. 11, 1934 |
| 1,998,526 | Schubert | Apr. 23, 1935 |
| 2,162,777 | Hagopian | June 30, 1939 |
| 2,317,043 | Eyman | Apr. 20, 1943 |
| 2,715,289 | Gale | Aug. 16, 1955 |

FOREIGN PATENTS

| | | |
|---|---|---|
| 453,855 | France | June 18, 1913 |
| 924,020 | France | July 24, 1947 |